2,754,274
POROUS SOLIDS AND THEIR PREPARATION

Jackson S. Boyer, Darby, Pa., assignor to Sun Oil Company, Philadelphia, Pa., a corporation of New Jersey No Drawing. Application February 24, 1951,
Serial No. 212,692

4 Claims. (Cl. 260—2.5)

This invention relates to a method for preparing rigid porous solid materials, and to the product thereby obtained.

According to the present invention, a rigid, porous solid suitable as a filter medium is prepared by heating a compact mass of solid melamine particles wetted with formalin, under pressure not substantially exceeding atmospheric pressure, in order not to substantially compress the compact mass during heating. It has been found that such heating results in the compact mass assuming a unitary structure and in the compact mass hardening through condensation of the melamine with the formalin to give a unitary rigid porous solid.

The product obtained by the above-described method has a porous, honeycombed structure and is permeable to liquids and gases. It is highly resistant to heat. The product of the present invention can be made in a particular desired shape by shaping the compact mass of solid particles wetted with formalin before hardening the mass by application of heat. For example, the product can be made as subsequently described in the shape of hollow cylinders for use in a manner known to the filtration art.

The product obtained by the method of the present invention is, by virtue of its above-described properties, capable of satisfactorily filtering solid particles from suspensions, including both aqueous and organic suspensions, and is therefore suitable for use as a filter medium.

In the method of the present invention, the compact mass of wetted solid particles can be prepared in any suitable manner. For example, particles of the solid material can be agitated with the liquid material to obtain uniform wetting of the particles and the mixture of solids and liquid then filtered to obtain a filter cake comprising the desired compact mass of wetted solid particles.

The particles of solid material used according to the present invention can vary widely in size. It is generally preferred that a major proportion of the mixture of particles used should be small enough to pass a 10 mesh U. S. Standard screen. Particularly good results are obtained when a major proportion of the particles are small enough to pass a 140 mesh U. S. Standard screen.

The formalin used according to the present invention can be any commercial or purified grade and can have added thereto, if desired, though it is not necessary, a condensation catalyst to promote hardening of the compact mass upon heating. The liquid material must not, however, be excessively acidic in reaction since acidic materials tend, if present in too large quantities, to dissolve the solid material, and the present invention contemplates only a method wherein a compact mass comprising undissolved solid material is hardened by heating. Formalin, as referred to in the present specification, is intended to indicate an aqueous solution of formaldehyde. Formalin generally contains about 40 per cent formaldehyde, but other concentrations can be used.

The heating of the compact mass of wetted solid particles is preferably conducted in a manner allowing escape of vapors from the compact mass and allowing expansion of the compact mass. Preferred ways of heating the compact mass include heating, as in an oven or water bath, the compact mass in a molding container which is open to the atmosphere so that the vapors can escape to the atmosphere through the opening.

The temperature to which the mass is heated according to the invention can be any temperature suitable for causing condensation of the solid material with the formalin or furfural. Condensation temperatures for melamine and formalin are known in the art. Preferred temperatures are those within the approximate range 50–150° C. Temperatures higher than 150° C. are preferably not used, since they tend to cause too rapid evolution of the liquid material from the compact mass.

Hollow cylindrical filter medium products can be made according to the present invention, e. g. by compacting solid particles wetted with liquid material in the annular space between a cylindrical mold and a cylindrical core centrally placed in the mold, and curing by heating to give the mass a porous structure and harden the mass.

Rigid solid materials prepared according to the present invention generally have one surface which is uneven, since the compact mass used to prepare the rigid solid is permitted to swell toward that surface during heating. Accordingly, it may be necessary, before using the rigid solid product, to smooth the uneven surface. This can be accomplished for example, by smoothing on a carborundum wheel or by other suitable means. The products are generally mechanically strong enough to stand up satisfactorily under such smoothing operations and under other operations which place a comparable degree of strain on the product.

The following example illustrates the preparation of rigid, porous solids according to the invention.

In this example, a rigid, porous solid material was prepared from melamine and formalin. The melamine used was a mixture of particles, all of which were small enough to pass a 10 mesh screen, and a major proportion of which were small enough to pass a 140 mesh screen. The U. S. Standard screen analysis of the melamine used is given as follows:

| Weight Percent | Passes— | Is Retained On— |
|---|---|---|
| 0.8 | 20 mesh screen | 40 mesh screen. |
| 31.1 | 40 mesh screen | 70 mesh screen. |
| 0.5 | 70 mesh screen | 80 mesh screen. |
| 1.9 | 80 mesh screen | 100 mesh screen. |
| 5.1 | 100 mesh screen | 140 mesh screen. |
| 15.7 | 140 mesh screen | 170 mesh screen. |
| 5.2 | 170 mesh screen | 230 mesh screen. |
| 1.8 | 230 mesh screen | 270 mesh screen. |
| 2.3 | 270 mesh screen | 325 mesh screen. |
| 32.3 | 325 mesh screen | |
| 3.3 | Lost in screening | |
| 100.0 | | |

One part by weight of melamine conforming substantially to the above was agitated with one part by weight of commercial grade formalin (40 per cent formaldehyde) and the resulting mixture was filtered with suction through a bed of sand contained in a crucible to obtain on top of the sand bed a filter cake comprising particles of melamine in a compact mass wetted with formalin. The crucible and filter cake were heated to 100° C. for 6 hours, in an oven. At the end of this time, the filter cake was found to have assumed a porous structure visible to the unaided eye, and to have hardened to a rigid solid material having good mechanical strength being neither brittle nor crumbly. This rigid solid material was permeable to water and suitable for use as a filter medium. A demonstration of its suitability for use as a filter medium was effected by preparing a suspension in water of a mixture of melamine particles conforming substantially to the mixture for which the screen analysis is given above, and filtering the suspension with suction through a rigid solid material prepared as described above. The rigid solid material filtered even the very fine particles of melamine from the suspension, as evidenced by the fact that a clear filtrate was obtained in which no cloudiness was perceptible by the unaided eye.

This example shows that a rigid porous solid material can be prepared by condensing by heat a compact mass of solid melamine particles wetted with formalin.

Products obtained according to the present invention are suitable not only for use as filter mediums for filtration of solid materials from suspensions, but also for use as diffusion screens in mass diffusion or gas diffusion operations.

In the method of the present invention, the compact mass which is cured by heat contains melamine which has not been condensed with formalin to any substantial degree of condensation beyond the slight degree which occurs, without heating, upon contact of the solid material with formalin. That is, substantially all the condensation required to convert melamine particles to hardened melamine-formaldehyde resin takes place after the compact mass of melamine particles wetted with formalin has been formed.

In my copending application Serial No. 212,693 filed February 24, 1951, there is disclosed and claimed a method of making rigid porous solid materials by condensing by heat compact masses of solid urea or thiourea particles wetted with formalin or furfural substantially in the absence of compression of the compact mass.

In my copending application Serial No. 212,691 filed February 24, 1951, now Patent No. 2,649,159 issued August 18, 1953, there is disclosed and claimed a method of sealing porous subterranean formations traversed by a borehole by introducing into the borehole a suspension of, for example, melamine in formalin, forcing the suspension into the porous formation thereby to filter out a layer at the face of the porous formation which layer comprises a compact mass of melamine particles wetted with formalin, and then allowing the compact mass to harden under elevated temperature and pressure to form a hard rigid solid sheath sealing off the porous formation. The hardening step of the above method is similar to the hardening step of the present invention, except that it is conducted under differential pressure and under conditions to substantially compress the compact mass during hardening. With pressure exerted on the compact mass, the hardening step of the method disclosed and claimed in the above-identified copending application results in a hard solid which is substantially impermeable.

I claim:

1. The method for making a rigid, porous, solid material which comprises; filtering a suspension of solid melamine particles in formalin to obtain a filter cake comprising a compact mass of melamine particles wetted with formalin; and condensing said filter cake by heat under pressure not substantially exceeding atmospheric pressure, thereby to react melamine and formaldehyde to form resinous material and to harden said resinous material to bind said filter cake into a rigid, porous solid material.

2. The method for making a rigid, porous, solid material which comprises; filtering a mixture of solid melamine particles and formalin to obtain a filter cake comprising melamine particles wetted with formalin, a major proportion of said particles being small enough to pass at 140 mesh U. S. Standard screen; and condensing said filter cake at 50–150° C. and atmospheric pressure, thereby to react melamine and formaldehyde to form resinous material and to harden said resinous material to bind said filter cake into a rigid, porous solid material.

3. Method according to claim 1 wherein said solid particles are a mixture of particles, a major proportion of which are small enough to pass a 10 mesh U. S. Standard screen.

4. Method according to claim 1 wherein said condensing by heat is carried out at a temperature within the approximate range 50° C. to 150° C.

References Cited in the file of this patent

UNITED STATES PATENTS

| | | |
|---|---|---|
| 2,562,866 | Kurtz et al. | July 31, 1951 |
| 2,611,750 | White | Sept. 23, 1952 |